(12) United States Patent
Goel et al.

(10) Patent No.: US 9,116,232 B2
(45) Date of Patent: Aug. 25, 2015

(54) METHODS AND APPARATUS FOR TESTING SATELLITE NAVIGATION SYSTEM RECEIVER PERFORMANCE

(75) Inventors: Nischay Goel, San Jose, CA (US); Vivek K. Jalahalli, San Diego, CA (US); Ruben Caballero, San Jose, CA (US); Ricardo R. Velasco, San Jose, CA (US); Anil Kumar Goparaju, San Jose, CA (US)

(73) Assignee: Apple Inc., Cupertino, CA (US)

( * ) Notice: Subject to any disclaimer, the term of this patent is extended or adjusted under 35 U.S.C. 154(b) by 628 days.

(21) Appl. No.: 13/447,015

(22) Filed: Apr. 13, 2012

(65) Prior Publication Data

US 2013/0271317 A1     Oct. 17, 2013

(51) Int. Cl.
*G01S 19/23*     (2010.01)

(52) U.S. Cl.
CPC ...................... *G01S 19/23* (2013.01)

(58) Field of Classification Search
USPC ............. 342/174, 357.4, 357.44, 357.62; 701/468, 470
See application file for complete search history.

(56) References Cited

U.S. PATENT DOCUMENTS

| | | | |
|---|---|---|---|
| 3,806,943 A | 4/1974 | Holloway | |
| 4,232,319 A | 11/1980 | Fusinski | |
| 4,864,315 A | 9/1989 | Mohuchy | |
| 5,134,405 A | 7/1992 | Ishihara et al. | |
| 6,127,970 A * | 10/2000 | Lin | 342/357.31 |
| 8,054,221 B1 | 11/2011 | Luong et al. | |
| 9,002,287 B2 | 4/2015 | Mow et al. | |
| 2003/0003883 A1 | 1/2003 | Wallace et al. | |
| 2006/0055592 A1 | 3/2006 | Leather et al. | |
| 2006/0057985 A1 | 3/2006 | Woo et al. | |
| 2006/0194553 A1 | 8/2006 | Ozaki et al. | |
| 2006/0229018 A1 | 10/2006 | Mlinarsky et al. | |
| 2007/0243826 A1 | 10/2007 | Liu | |
| 2007/0257838 A1 | 11/2007 | Cheng | |
| 2008/0056340 A1 | 3/2008 | Foegelle | |
| 2008/0085704 A1 | 4/2008 | Dieudonne et al. | |
| 2008/0129615 A1 | 6/2008 | Breit et al. | |
| 2008/0305754 A1 | 12/2008 | Foegelle | |

(Continued)

FOREIGN PATENT DOCUMENTS

EP     2285021     2/2011

OTHER PUBLICATIONS

Borsato et al., "A-GPS Over-The-Air Test Method: Business and Technology Implications", Spirent Communications, 2009.
"Test Solutions for Interference, Anit-Jam, GPS/Inertial, Interference Mitigation", Spirent, 2012.
Reed, "Summary of the Channel Emulator based MIMO OTA Method," Oct. 1, 2009.

(Continued)

*Primary Examiner* — Dao Phan
(74) *Attorney, Agent, or Firm* — Treyz Law Group; Jason Tsai; Joseph F. Guihan

(57) ABSTRACT

A test system for performing over the air testing on a device under test (DUT) with satellite navigation system capability is provided. The test system may include a test host, a satellite navigation system emulator, a test chamber in which the DUT may be placed during testing, and test antennas mounted inside the test chamber. The satellite navigation system emulator may receive ephemeris and almanac data and may generate corresponding simulated test signals to be transmitted to the DUT via the test antennas. The test antennas may be mounted on fixed or rotatable ring-shaped antenna mounting structures configured to emulate respective orbital planes in a given satellite constellation that is currently being characterized. The DUT may also be rotated during testing to emulate user movement.

14 Claims, 9 Drawing Sheets

(56) References Cited

U.S. PATENT DOCUMENTS

| | | |
|---|---|---|
| 2010/0231232 A1 | 9/2010 | Jackson et al. |
| 2010/0268459 A1 | 10/2010 | O'Shea |
| 2011/0084887 A1 | 4/2011 | Mow et al. |
| 2011/0124295 A1 | 5/2011 | Mahjoubi Amine et al. |
| 2011/0257923 A1 | 10/2011 | Boulton |
| 2011/0299570 A1 | 12/2011 | Reed |
| 2011/0306306 A1 | 12/2011 | Reed |
| 2012/0053879 A1 | 3/2012 | Chang et al. |
| 2012/0071107 A1 | 3/2012 | Falck et al. |

OTHER PUBLICATIONS

Kolu, "Summary of the anechoic chamber and fading emulator based MIMO OTA solution," Elektrobit Corporation, Oct. 1, 2009.

Jamsa, "Proposal for common approach on MIMO OTA," Elektrobit Corporation, Oct. 1, 2009.

Yamamoto, "Handset MIMO antenna measurement using a Spatial Fading Emulator," Oct. 1, 2009.

\* cited by examiner

METHODS AND APPARATUS FOR TESTING SATELLITE NAVIGATION SYSTEM RECEIVER PERFORMANCE

BACKGROUND

This invention relates to electronic devices and more particularly, to portable electronic devices with satellite navigation system capabilities.

Electronic devices use satellite navigation systems to support navigation functions. For example, an electronic device may use a satellite navigation system such as the Global Positioning System (GPS) to obtain position information, timing information, and other navigation information. The Global Positioning System includes satellites that orbit the Earth, Earth-based control and monitoring stations, and GPS receivers that are located within the electronic devices. GPS services may be provided on a continuous basis anywhere that is within range of the orbiting satellites.

A portable electronic device may include a GPS receiver. The GPS receiver is used to determine the current position (location) of the portable electronic device. During operation, the GPS receiver may receive data streams from GPS satellites orbiting the Earth. Using a local clock, the GPS unit analyzes each data stream to make a transit time and distance estimation.

A method known as geometric trilateration may be used to determine the location of the electronic device by analyzing the estimated distances of each of the satellites relative to the GPS receiver. It may be desirable to characterize the performance of the GPS receiver to determine whether the GPS receiver satisfies design criteria during normal wireless operation.

Conventional arrangements for testing GPS receiver performance involve placing an electronic device under test (DUT) within a test chamber and using a single test antenna within the test chamber to transmit GPS signals to the GPS receiver. The test antenna transmits the GPS signals at a selected power level. If the signal strength of GPS signals being received at the GPS receiver exceeds a predetermined threshold level, the GPS receiver satisfies design criteria. If the signal strength of the GPS signals being received at the GPS receiver is less than the predetermined threshold level, the GPS receiver fails to satisfy design criteria. Testing GPS performance using only one antenna, however, does not accurately characterize the behavior of the GPS receiver in a real world environment (i.e., a real world environment in which multiple GPS satellites simultaneously transmit radio-frequency signals to the GPS receiver).

It would therefore be desirable to be able to provide improved ways for testing satellite navigation system receiver performance.

SUMMARY

A radio-frequency test system for testing a wireless electronic device is provided. The electronic device currently being tested may be referred to as a device under test (DUT). The DUT may contain wireless communications circuitry such as a cellular telephone transceiver, a local area network transceiver, and a satellite navigation system receiver. The test system may be used to characterize the performance of the satellite navigation system receiver.

The test system may include a test host, a satellite navigation system simulator, a test chamber, and multiple test antennas within the test chamber. A DUT may be attached to a DUT holder within the test chamber during testing. The DUT holder may be configured to rotate the DUT during testing. The satellite navigation system simulator may receive at least ephemeris and almanac data and may generate corresponding radio-frequency test signals based on the supplied ephemeris and almanac data. The test signals may be radiated over the air to the DUT via the test antennas.

The test antennas may be mounted on antenna mounting structures positioned within the test chamber. The antenna mounting structures may be ring-shaped support structures to which the test antennas can be mounted. Test antennas associated with each antenna mounting structure may form a circular antenna array that serve to emulate the behavior of satellites associated with a respective orbital plane in a given satellite constellation (e.g., each test antenna may be placed in a desired position relative to the DUT and may radiate simulated signals that are similar to signals that would have been broadcast by the satellite that is being emulated by that test antenna). The antenna mounting structures may be fixed or rotated during testing. The test host may be used to control the orientation of the DUT, the movement of the antenna mounting structures, and operation of the satellite navigation system emulator 204 during test operations.

Further features of the present invention, its nature and various advantages will be more apparent from the accompanying drawings and the following detailed description.

DETAILED DESCRIPTION

Embodiments of the present invention relate to techniques for testing the performance of satellite navigation receivers in electronic devices. Electronic devices such as portable electronic devices and other electronic equipment may be used to provide navigation services. Such types of electronic devices may include a laptop computer, a tablet computer, a somewhat smaller device such as a wrist-watch device, pendant device, headphone device, earpiece device, or other wearable or miniature device, a cellular telephone, a media player, etc. Electronic devices with satellite navigation capabilities may provide a user with reliable positioning and timing services (e.g., to support navigation applications, games, applications with maps, and other location-based settings).

Figure 1:
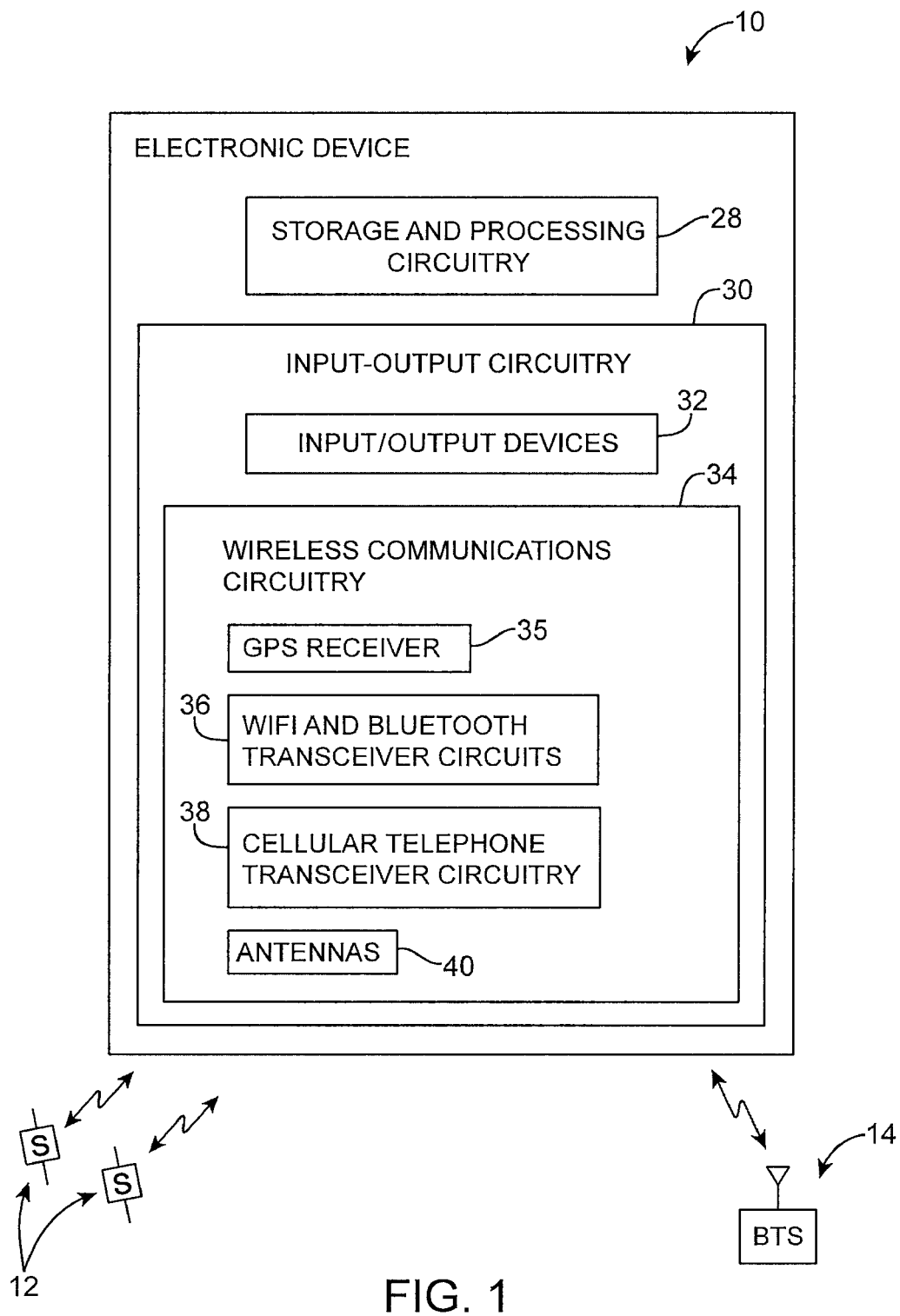
FIG. 1 is a schematic diagram of an illustrative electronic device with wireless communications circuitry in accordance with an embodiment of the present invention.

A schematic diagram of an electronic device such as electronic device 10 is shown in FIG. 1. As shown in FIG. 1, electronic device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network (WLAN) protocols (e.g., IEEE 802.11 protocols—sometimes referred to as WiFi®), protocols for other short-range wireless communications links such as the Bluetooth® protocol, cellular telephone protocols, etc.

Circuitry 28 may be configured to implement control algorithms that control the use of antennas in device 10. For example, to support antenna diversity schemes and MIMO schemes or beam forming or other multi-antenna schemes, circuitry 28 may perform signal quality monitoring operations, sensor monitoring operations, and other data gathering operations and may, in response to the gathered data, control which antenna structures within device 10 are being used to receive and process data. As an example, circuitry 28 may control which of two or more antennas is being used to receive incoming radio-frequency signals, may control which of two or more antennas is being used to transmit radio-frequency signals, may control the process of routing incoming data streams over two or more antennas in device 10 in parallel, etc.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Wireless communications circuitry 34 may include satellite navigation system receiver circuitry 35, transceiver circuitry such as transceiver circuitry 36 and 38, and antenna circuitry 40. Satellite navigation system receiver 35 may be used to support satellite navigation services such as United States' Global Positioning system (GPS) (e.g., for receiving satellite positioning signals at 1575 MHz), Russia's Global Navigation Satellite System (GLONASS) (e.g., for receiving satellite positioning signals at 1602 MHz), China's Compass also known as the Beidou Global navigation system (e.g., for receiving satellite positioning signals at 1561 MHz), Europe's Galileo positioning system (e.g., for receiving satellite positioning signals at 1164 MHz), and/or other satellite navigation systems.

Transceiver circuitry 36 may handle 2.4 GHz and 5 GHz bands for WiFi® (IEEE 802.11) communications and may handle the 2.4 GHz Bluetooth® communications band. Circuitry 36 may sometimes be referred to as wireless local area network (WLAN) transceiver circuitry (to support WiFi® communications) and Bluetooth® transceiver circuitry. Circuitry 34 may use cellular telephone transceiver circuitry (sometimes referred to as cellular radio) 38 for handling wireless communications in cellular telephone bands such as bands at 850 MHz, 900 MHz, 1800 MHz, 1900 MHz, and 2100 MHz or other cellular telephone bands of interest.

Examples of cellular telephone standards that may be supported by wireless circuitry 34 and device 10 include: the Global System for Mobile Communications (GSM) "2G" cellular telephone standard, the Evolution-Data Optimized (EVDO) cellular telephone standard, the "3G" Universal Mobile Telecommunications System (UMTS) cellular telephone standard, the "3G" Code Division Multiple Access 2000 (CDMA 2000) cellular telephone standard, and the "4G" Long Term Evolution (LTE) cellular telephone standard. Other cellular telephone standards may be used if desired. These cellular telephone standards are merely illustrative.

Wireless communications circuitry 34 may include circuitry for other short-range and long-range wireless links if desired. For example, wireless communications circuitry 34 may include wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structure, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link and another type of antenna may be used in forming a remote wireless link.

Satellite navigation system receiver 35 may receive radio-frequency signals from an associated group of satellites 12 such as satellites 12 orbiting the Earth. Each group of satellites operating in concert to provide coordinated ground coverage may be referred to collectively as a satellite constellation. For example, the GPS constellation may include a first set of at least 24 satellites that are evenly distributed among six different orbital planes. As another example, the GLONASS constellation may include a second set of at least 24 satellites (i.e., satellites different than the first set of GPS satellites) that are equally distributed among three different orbital planes. In general, a satellite constellation may include any suitable number of associated satellites distributed among any number of orbital planes. Receiver 35 may be configured to calculate its position by precisely timing the signals that are being transmitted by associated satellites 12. For example, each GPS satellite 12 may continuously broadcast signals to receiver 35. The broadcasted signals may include information such as the time the signals were sent, relevant orbital information (e.g., the precise location of each satellite), and other related information.

Receiver 35 may receive the broadcasted satellite information. Receiver 35 may analyze the times at which the signals are received. Receiver 35 may calculate the transit time for each received signal based on measured timing information. The transit time of each message may be multiplied by the speed of light (e.g., the speed at which wireless signals propagate through air) to compute the distance between user device 10 and each corresponding navigation system satellite 12.

Geometric trilateration techniques may then be used to combine the computed distances with the GPS satellites' current locations to determine the position (location) of receiver 35. Receiver 35 may feed the obtained location data to storage and processing circuitry 28. The process of obtaining the current location of device 10 is sometimes referred to as obtaining a satellite navigation system fix (or a location fix). In addition to determining the current location, receiver 35 may provide time-to-fix (TTF) data (e.g., data indicating the amount of time it takes for receiver 35 to acquire an updated location fix). Satellite navigation system receiver 35 may also be used to obtain other useful location information such as the altitude, direction, and speed of device 10.

As shown in FIG. 1, device 10 may also communicate with a base station such as base transceiver station 14. In particular, radio-frequency signals may be conveyed between cellular telephone transceiver circuitry (cellular radio) 38 and base station 14 during a phone call (as an example).

Satellite navigation system receiver 35 and other electrical components within device 10 may be manufactured using state of the art semiconductor fabrication processes. Each manufactured part may, however, suffer from process variation. During device assembly, workers and automated assembly machines may be used to form welds, machine features into conductive device structures, connect connectors for antennas and other components to mating connectors, and otherwise form and interconnect electronic device structures within device 10. If care is not taken, faults may result that can impact the performance of a final assembled device. Process variation, assembly faults, the design of receiver 35, the isolation of receiver 35 from other device components, and/or other device operating factors can impact the performance of receiver 35 during normal user operation. It may therefore be desirable to test the satellite navigation system receiver performance of device 10 to determine whether receiver 35 satisfies design criteria.

Figure 2:
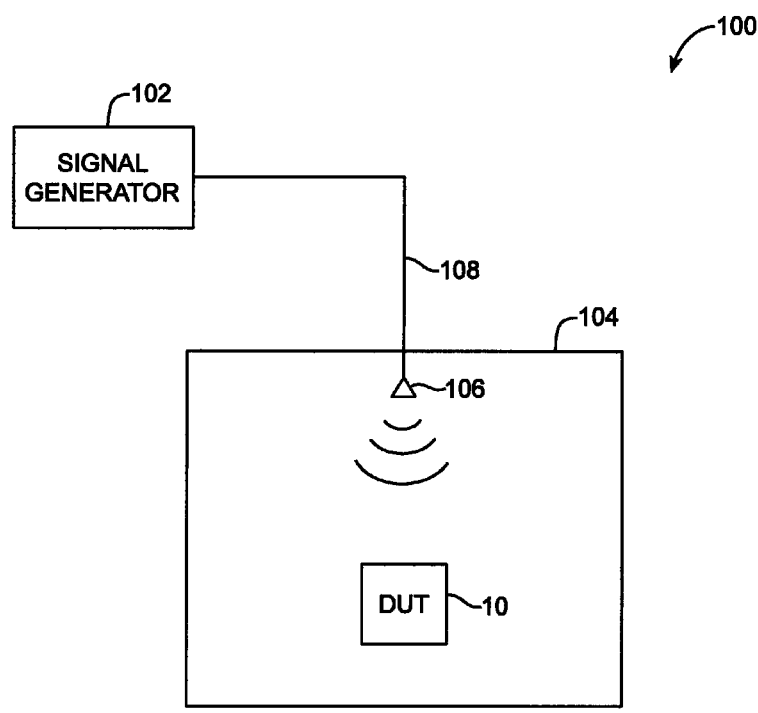
FIG. 2 is a diagram of a conventional test system for testing satellite navigation system receiver performance.

FIG. 2 is a diagram of a conventional test system 100 for testing the satellite navigation system performance of device 10. Device 10 that is currently being tested may be referred to as a device under test (DUT). As shown in FIG. 2, test system 100 includes a signal generator 102, a test chamber 104 in which DUT 10 is placed during testing, and a test antenna 106 positioned within test chamber 104. Test antenna 106 is connected to an output port of signal generator 102.

Signal generator 102 is configured to generate test signals. The test signals are fed to antenna 106 via a coaxial cable 108. The test signals are then transmitted over the air using antenna 106 to receiver 35 within DUT 10. Data can then be gathered from DUT 10 to determine whether receiver 35 is operating satisfactorily. Performing testing by transmitting wireless test signals to DUT 10 within an enclosed chamber is sometimes referred to as "over-the-air" testing. Testing the performance of receiver 35 in this way, however, may not yield accurate results. During real world scenarios, receiver 35 does not only receive signals from a single wireless source but receives signals from multiple wireless signal sources (i.e., device 10 simultaneously receives radio-frequency signals from multiple navigation system satellites during normal user operation).

Figure 3:
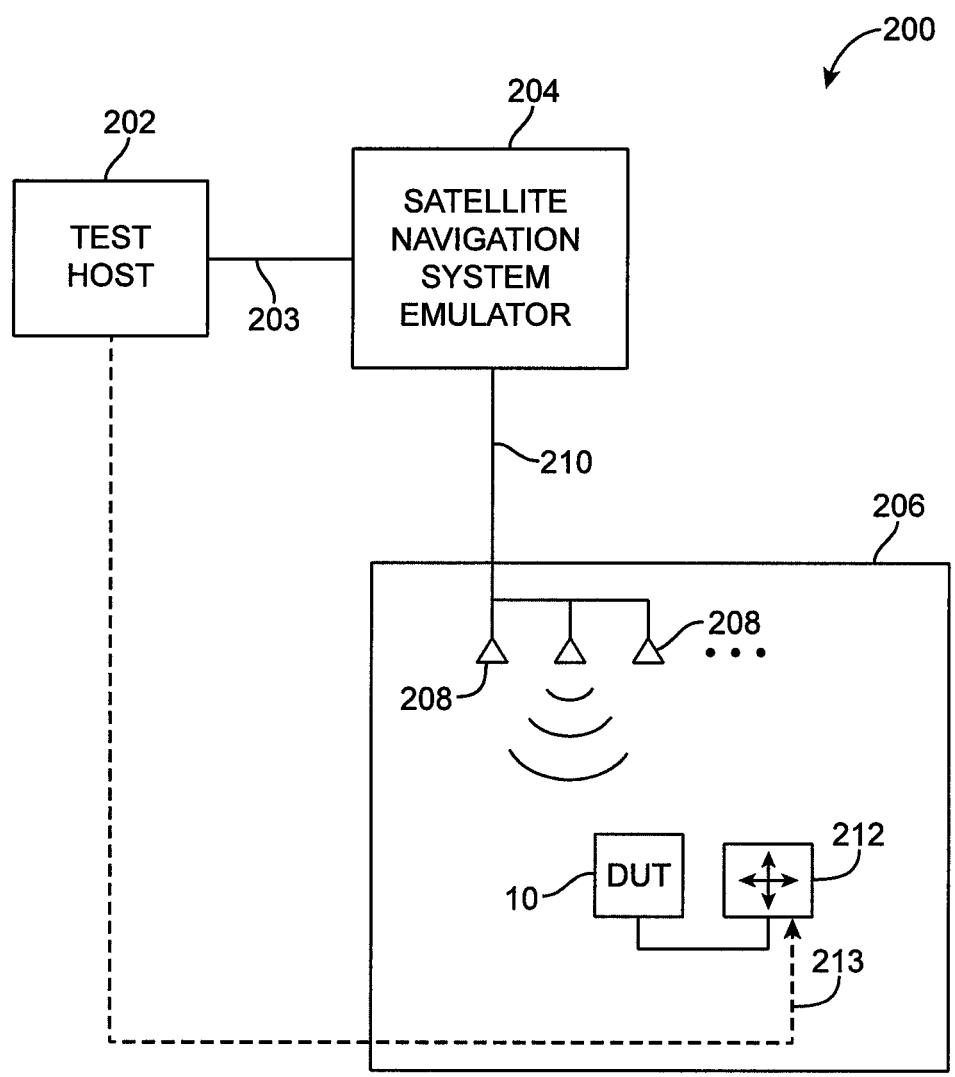
FIG. 3 is a diagram of an illustrative test system that includes multiple test antennas and that is used for characterizing satellite navigation system receiver performance in accordance with an embodiment of the present invention.

During product design verification, many wireless devices (e.g., hundreds, thousands, or more of DUTs 10) may be tested in a test system such as test system 200 of FIG. 3. Test system 11 may include testers, tester control boxes, test accessories, computers, network equipment, cabling, test chambers with antennas, and other test equipment for transmitting and/or receiving radio-frequency test signals and gathering test results.

An example, test system 200 may include a test host such as test host 202 (e.g., a personal computer), a tester such as satellite navigation system emulator 204, and a test chamber such as test chamber 206. Test chamber 206 may have a cubic structure (six square walls) or a rectangular prism-like structure (six rectangular walls), if desired. Test chamber 206 may be internally lined by absorbent material. The absorbent material may be formed from rubberized pyramid-shaped foams or other suitably lossy material. Test chamber 206 may sometimes be referred to as an anechoic chamber. If desired, reverberation chambers (e.g., chambers with one or more tuners that can be moved to different orientations to obtain varying spatial distribution of electrical and magnetic field strength) may also be used.

Test chambers 206 may each include multiple antennas such as antennas 208 mounted inside chamber 206. Antennas 208 may sometimes be referred to as test antennas, test chamber antennas, or over-the-air (OTA) antennas. Antennas 208 may, for example, be patch antennas, spiral antennas, horn antennas, or other types of antennas. Test chamber 206 may therefore be referred to as a multi-antenna test chamber, because test chamber 206 contains more than one antenna. In the example of FIG. 3, only three antennas 208 are shown. If desired, less than three, more than three, at least 10, at least 24, or at least 50 test antennas 208 may be mounted within test chamber 206.

During testing, DUT 10 may be placed inside test chamber 206 while test antennas 208 radiate radio-frequency test signals to antennas 40 of DUT 10 (e.g., antennas 40 that are switchably coupled to satellite navigation system receiver 35). In particular, DUT 10 may be attached to a positioner such as positioner 212 when DUT 10 is placed within test chamber 206. Positioner 212 may be a computer-controlled or manually-controlled positioning device that can be used to change the position and orientation of DUT 10 within test chamber 206 during testing. For example, positioner 212 may include actuators for controlling lateral and/or rotational movement of DUT 10 and may therefore sometimes be referred to as a DUT rotator. DUT rotator 212 may be controlled using control signals generated by test host 202 routed over path 213.

Tester 204 may be operated directly or via computer control (e.g., when tester 204 receives commands from test host 202). When operated directly, a user may control tester 204 by supplying commands directly to the tester using the user input interface of the test unit. For example, a user may press buttons in a control panel on the tester while viewing information that is displayed on a display in the tester. In computer controlled configurations, a test host such as computer 202 (e.g., software running autonomously or semi-autonomously on the computer) may communicate with the tester (e.g., by sending and receiving data over a wired path 203 or a wireless path between the computer and the tester).

Tester 204 may be a tester of the type that is sometimes referred to as a test box or a radio communications tester. Tester 204 may be used to perform radio-frequency signaling tests for a variety of different radio-frequency communications bands and channels. In one suitable embodiment of the present invention, tester 204 may be a satellite navigation system emulator. Emulator 204 may be capable of receiving ephemeris data, almanac, and other navigation information from a user (e.g., settings that are supplied by a test operator).

The ephemeris data may include information indicating the precise orbital position of each satellite 12 in a given constellation. During normal device operation, each satellite in a given constellation may transmit respective ephemeris data to receiver 35 so that a position fix can be accurately calculated. A position fix may not be computed until receiver 35 obtains ephemeris data from at least a certain number of satellites in the given constellation. Because the ephemeris information is considered high resolution, the ephemeris information is typically valid for, as an example, no more than four hours after broadcast and needs to be regularly updated (e.g., ephemeris should be updated at least once every four hours).

Whereas the ephemeris data contains highly precise information, the almanac includes coarse orbital and status information reflective of the arrangement of an entire satellite constellation. Because the almanac information is considered to be lower resolution, the almanac can be valid for up to 180 days and may be updated on a substantially less frequent basis relative to the ephemeris. The almanac data is typically used during device start-up to help receiver 35 determine which satellites are currently visible based on the last stored location of device 10 and where each of the visible satellites are approximately located. Once receiver 35 detects the visible satellites, receiver 35 retrieves corresponding ephemeris data to acquire a location fix. The almanac is typically not used to compute the actual position of device 10. A location fix may be calculated entirely based on the ephemeris data received from detected satellites 12.

As satellites 12 in a given satellite constellation orbit the Earth, the precise configuration of the given constellation at any given point in time can be described by associated ephemeris and almanac data. For example, a table containing ephemeris and almanac data may be provided that describes the precise position of each satellite 12 in a given constellation at any point in history (including all past and present configurations). Because the orbital patterns of satellites 12 are well known, ephemeris and almanac information describing the precise configuration of the given constellation at any future point in time can be predicted and tabulated. In other words, it is possible to obtain ephemeris and almanac data that describes the precise configuration of any existing satellite constellation (e.g., the GPS satellite constellation, the GLONASS satellite constellation, etc.) at a selected moment in history, at the present moment, or any a desired point in the future.

In one suitable arrangement, test host 202 may provide ephemeris data, almanac data, and other raw data to satellite navigation system emulator 204 so that emulator 204 can generate simulated radio-frequency signals that would have been broadcast to DUT 10 at a selected point in time in a particular location. For example, test host 202 may provide a first set of ephemeris and almanac data during a first test iteration to emulator 204 so that emulator 204 can simulate satellite signals that device 10 received on Mar. 1, 2012 at 11:00 PM if device 10 were located in Tokyo, Japan. As another example, test host 202 may provide a second set of ephemeris and almanac data during a second test iteration to emulator 204 so that emulator 204 can simulate satellite signals that device will receive on Dec. 14, 2015 at 08:45 AM if device 10 were located in Los Angeles, Calif. These simulated satellite signals may be fed to respective test antennas 208 within test chamber 206 so that each test antenna serves as one satellite 12 in a given constellation. Emulator 204 may therefore sometimes be referred to as a satellite navigation system simulator.

Figure 4:
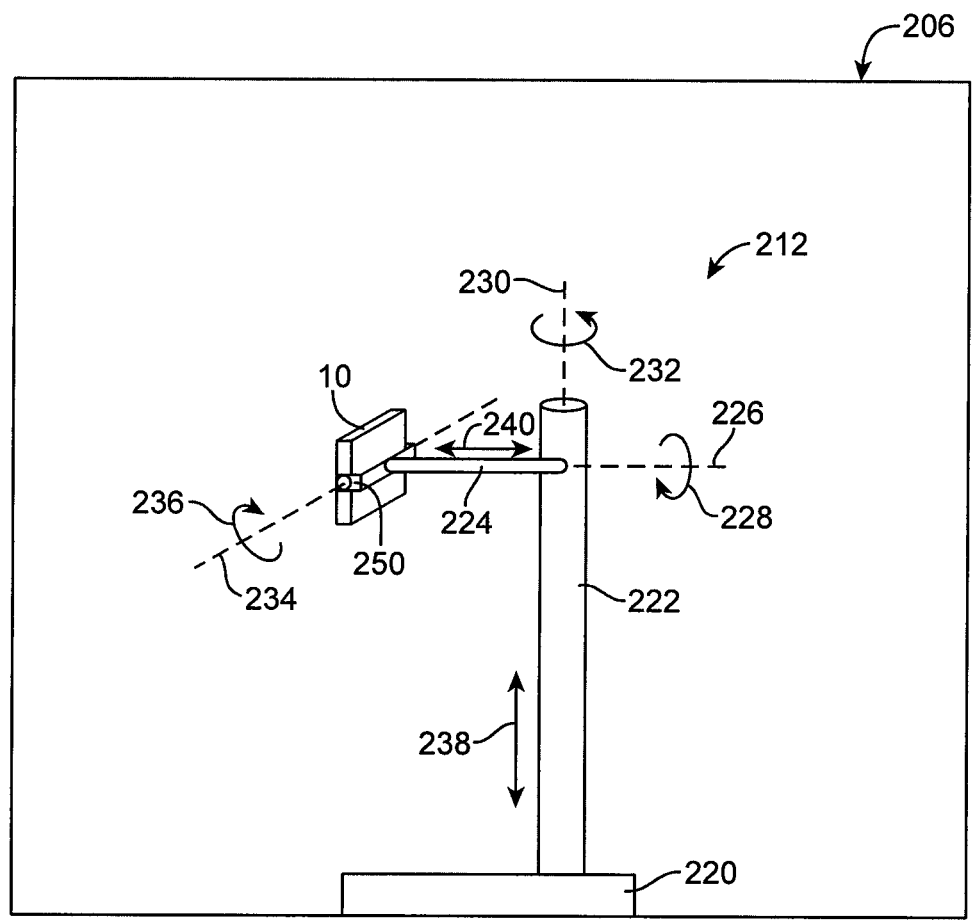
FIG. 4 is a diagram of an illustrative device under test (DUT) positioner in accordance with an embodiment of the present invention.

DUT 10 need not be secured in a fixed orientation within test chamber 206 and may be mounted on a movable support structure 212 (see, e.g., FIG. 4). DUT 10 may be rotated using structure 212 to emulate potential movement of device 10 during normal user operation as the user handles device 10. As shown in FIG. 4, DUT 10 may be rotated in multiple directions. Structure 212 may include a movable base structure such as base 220, a first rod structure 222 that is attached to base 220, a second rod structure 224 that is attached to first rod structure 222, and a DUT holder 250. Base 220 may be stationed at any desired location within test chamber 206. Rod 222 may be oriented perpendicular to base 220, whereas rod 224 may be oriented perpendicular to rod 222 and parallel to base 220 (as an example). DUT holder 250 may latch on to DUT 10 during testing.

Using a motor or other positioning equipment that is part of structure 212, rod 222 may be rotated about rotational axis 230 in the direction of arrow 232 and may be vertically adjusted in the direction of arrow 238. Rod 224 may similarly be rotated about rotational axis 226 in the direction of arrow 228 and may be laterally adjusted in the direction of arrow 240. DUT 10 may also be rotated about rotational axis 234 in the direction of arrow 236 using DUT holder 250. Rotating DUT 10 about three orthogonal axes in this way may allow test system 200 to gather data for a variety of desired beam angles. If desired, DUT 10 may be fixed in place so there is no rotational or translational movement during testing. The movable DUT support structure 212 of FIG. 4 is merely illustrative and does not serve to limit the scope of the present invention. If desired, other suitable positioning equipment may be used to rotate and shift DUT 10 within test chamber 206 during over the air (OTA) testing.

It may be desirable to physically orient test antennas 208 within test chamber 206 in a way that partially emulates the geometric configuration of satellites 12 in a real world scenario. In one suitable arrangement of the present invention, test antennas 208 may be mounted on a ring-shaped antenna mounting structure 300 (see, e.g., FIG. 5). It may be desirable to form some or all of support structure 300 from dielectric materials to ensure radio-frequency transparency.

Figure 5:
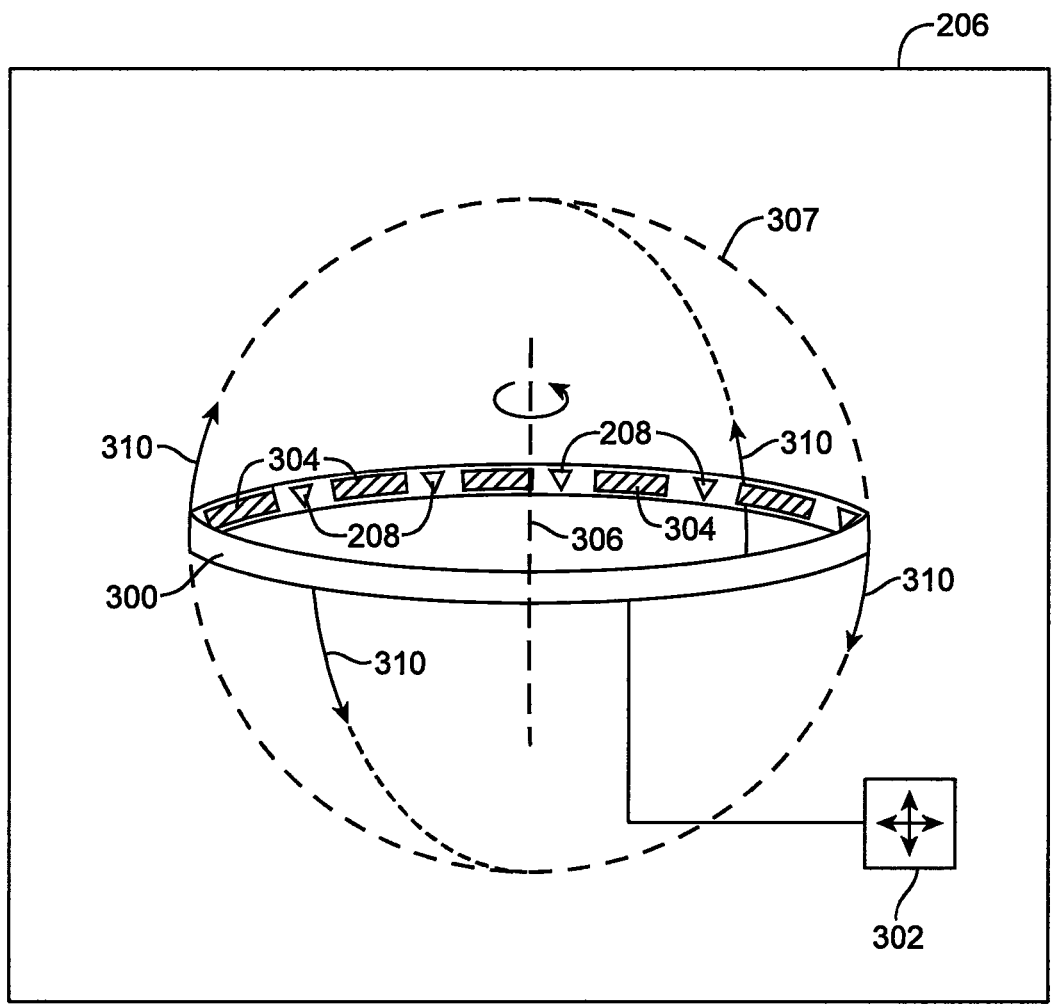
FIG. 5 is a diagram of an illustrative rotatable antenna mounting structure for supporting the multiple test antennas of FIG. 3 in accordance with an embodiment of the present invention.

As shown in FIG. 5, test antennas 208 may be attached to the ring-shaped antenna mounting structure 300 to form a circular antenna array. For example, 24 test antennas 208 may be mounted on structure 300 in an equally distributed arrangement. Each pair of test antennas 208 may be separated by absorbent material 304 that is used to minimize reflections and to provide electromagnetic isolation among the different radiating antennas 208.

Antenna mounting ring 300 may be suspended using motorized positioning equipment 302. Equipment 302 may include mechanical devices (e.g., motors, pulleys, gears, etc.) that can be used to raise or lower the position of structure 300, to rotate structure 300 about axis 306, or to rotate structure 300 in any desired manner (as shown by arrows 310). Ring structure 300 may or may not be rotated during testing. In either scenario, DUT 10 should remain substantially within ring structure 300 during testing (e.g., within region 307 as illustrated in FIG. 5). In general, antenna mounting structure 300 may have any other suitable planar two-dimensional shape (e.g., a rectangular mounting structure shape on which a rectangular array of OTA test antennas may be mounted, an elliptical mounting structure shape on which an elliptical array of OTA test antennas may be mounted, a triangular mounting structure shape on which a triangular array of OTA test antennas may be mounted).

Figure 6:
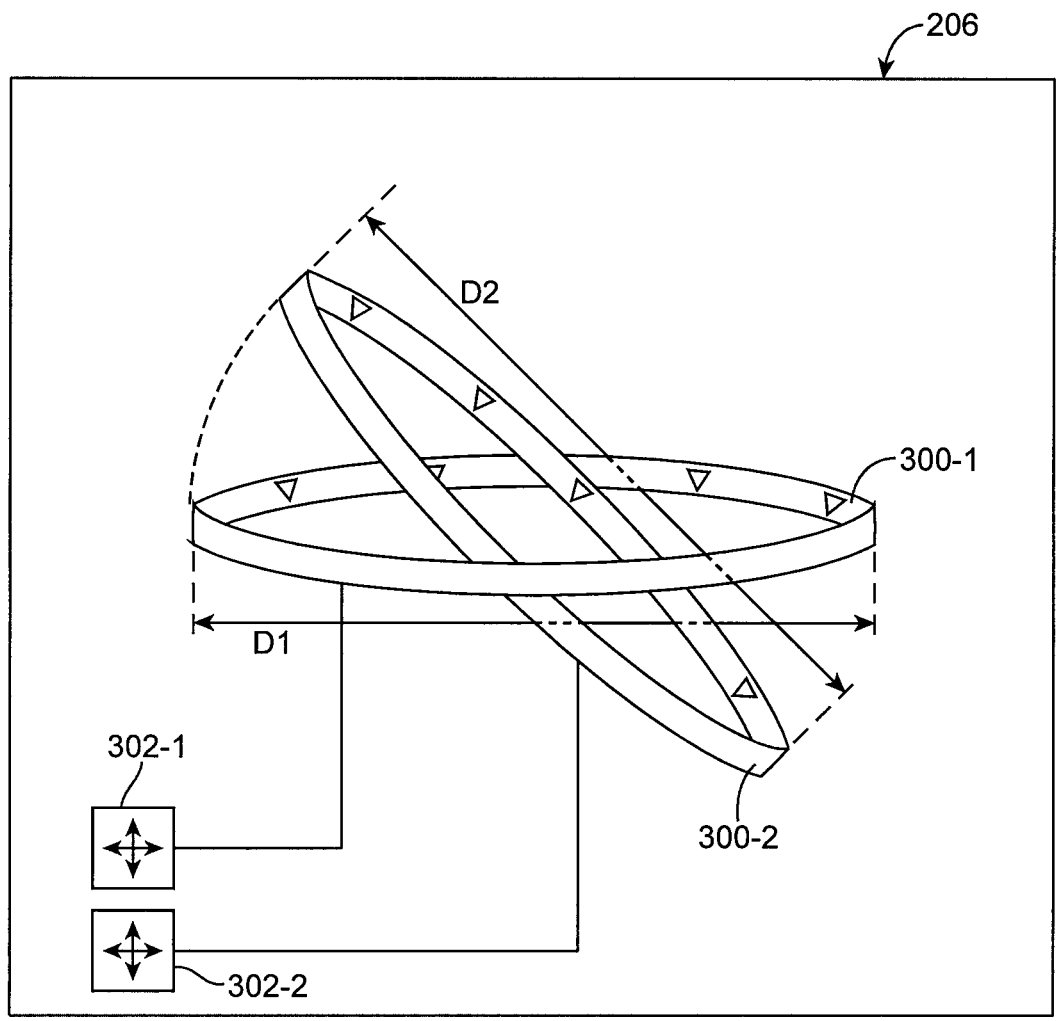
FIG. 6 is a diagram of multiple rotatable antenna mounting structures in accordance with an embodiment of the present invention.

In another suitable arrangement, multiple ring-shaped test antenna mounting structures may be positioned within test chamber 206 (see, e.g., FIG. 6). As shown in FIG. 6, a first antenna mounting structure 300-1 and a second antenna mounting structure 300-2 may be positioned within test chamber 206. The lateral/rotational movement of structure 300-1 may be controlled using first positioning equipment 302-1, whereas the lateral/rotational movement of structure 300-2 may be controlled using second positioning equipment 302-2. First structure 300-1 may have a first diameter D1 while second structure 300-2 may have a second diameter D2 that is different than D1. If desired, the diameters of structures 300-1 and 300-2 may be equal.

Test antennas 208 mounted on structure 300-1 may serve to emulate navigation system satellites associated with a first orbital plane in a given constellation, whereas test antennas 208 mounted on structure 300-2 may serve to emulate navigation system satellites associated with a second orbital plane in the given constellation. Test antennas 208 may not only be physically positioned to emulate the spatial configuration of a given satellite constellation but may also be configured to radiate simulated test signals similar to signals that would have been transmitted by satellite 12 in that corresponding position in the given satellite constellation. Configured in this way, DUT 10 is tested in a controlled, repeatable setting that is similar to real-world environments (at least from the perspective of DUT 10).

If desired, at least three ring-shaped antenna mounting structures 300 (each of which includes eight test antennas 208) may be used to emulate the GLONASS orbital planes or at least six ring-shaped antenna mounting structures 300 (each of which includes four test antennas 208) may be used to emulate the GPS orbital planes, as examples.

In general, test chamber 206 may include any number of antenna mounting structures 300, each of which includes any desired number of test antennas 208, each of which is controlled using associated positioning equipment 302, and each of which has any suitable diameter. If desired, antenna mounting structures 300 may be configured in fixed positions during testing. Whether or not structures 300 are fixed or moving during testing, test antennas 208 on a particular antenna mounting structure can be selectively activated (e.g., any desired portion of test antennas 208 that serves as part of a common orbital plane may be switched into use while other antennas positioned in that orbital plane are turned off). Each antenna 208 may be configured to radiate appropriate satellite test signals that are generated using emulator 204 based on the user-supplied ephemeris and almanac data.

Figure 7:
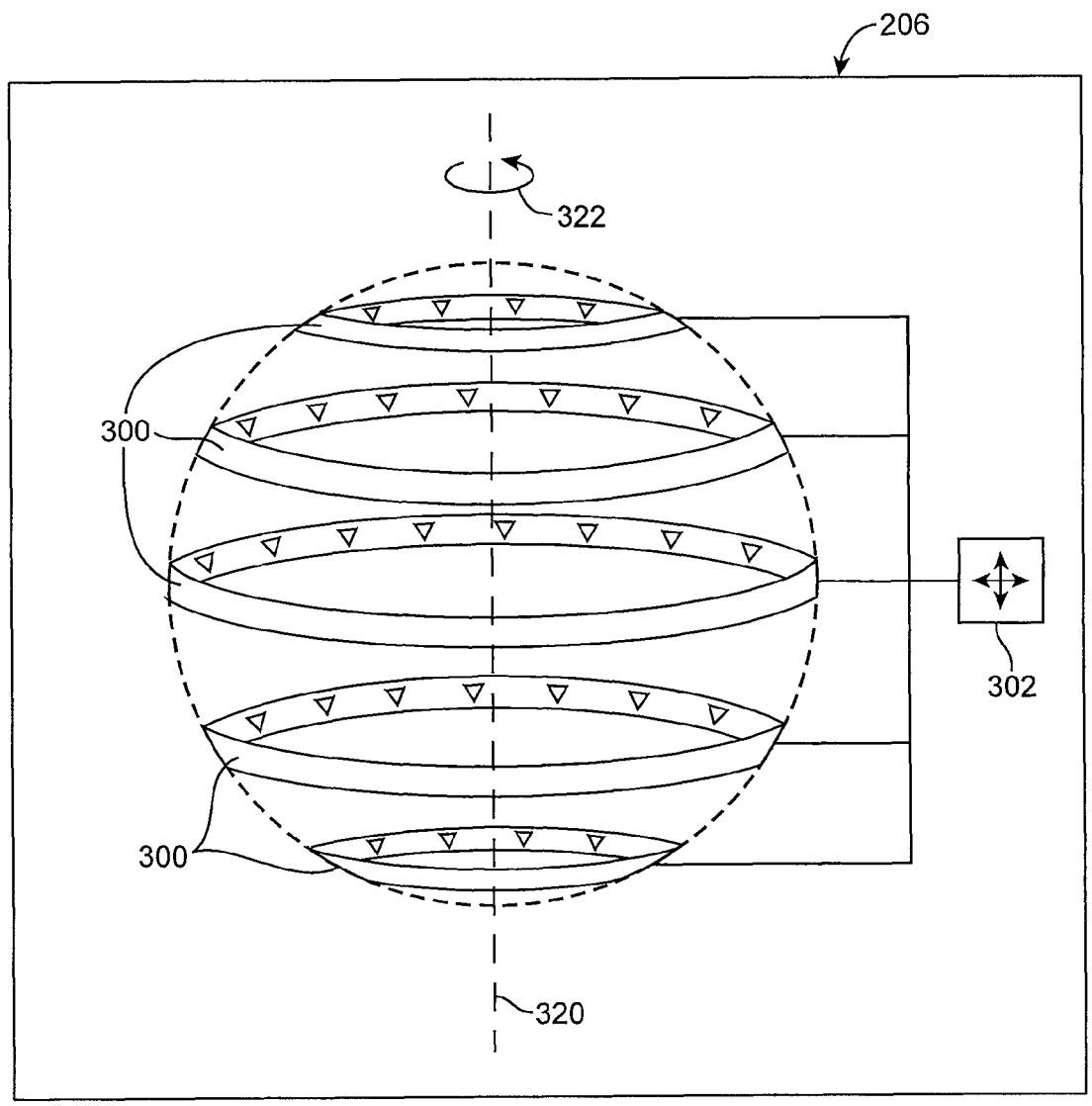
FIG. 7 is a diagram of multiple antenna mounting structures rotatable about a common rotational axis in accordance with an embodiment of the present invention.

In another suitable arrangement, multiple ring-shaped antenna mounting structures 300 of varying sizes may be used to form a spherical antenna mounting structures (see, e.g., FIG. 7). Each of the multiple ring-shaped antenna mounting structures 300 may be lined by absorbers. Test antennas 208 may be embedded in the absorbers. Antenna mounting structures 300 may be individually or collectively rotated about axis 320 in the direction of arrow 322 using positioning equipment 302.

Figure 8:
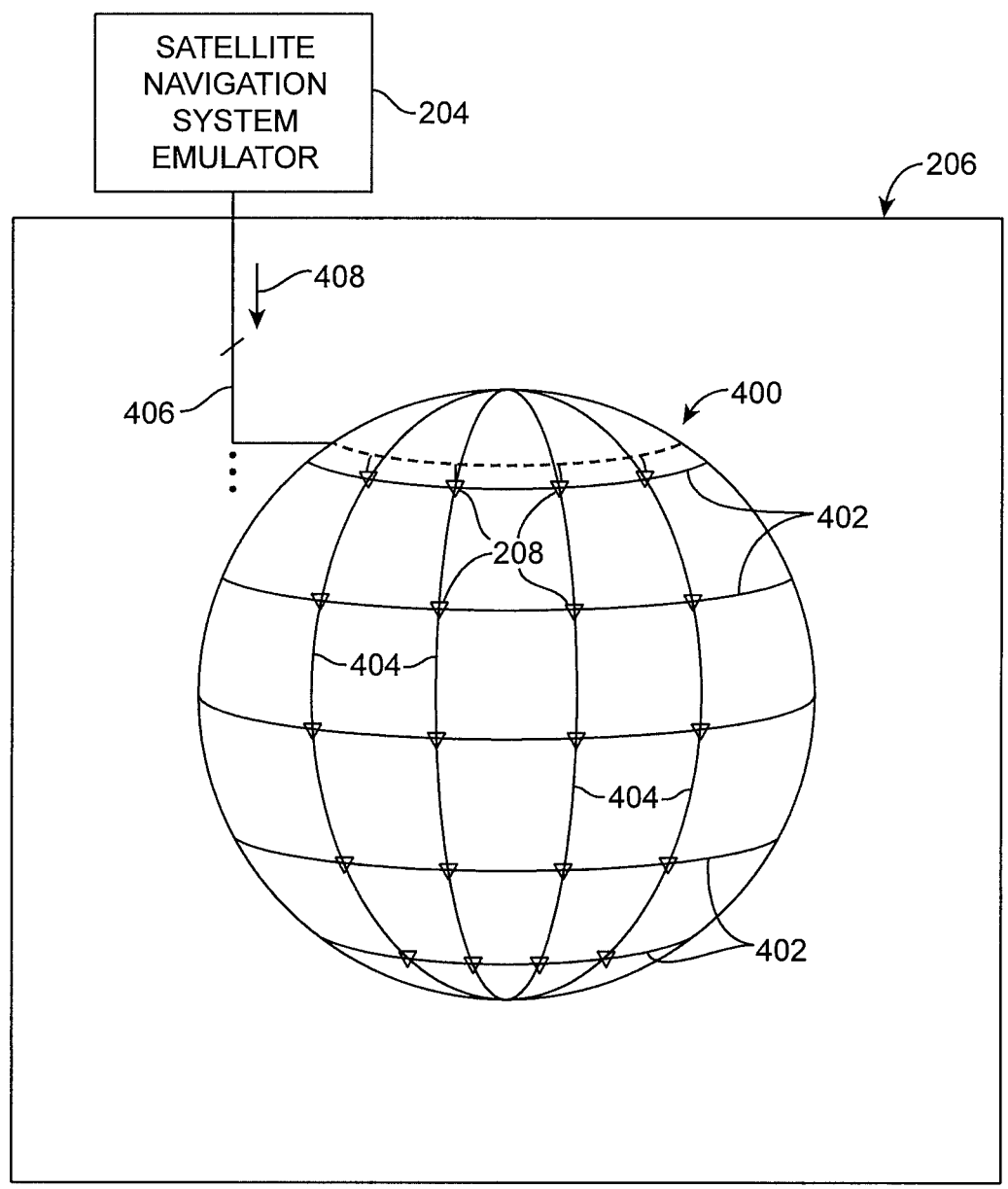
FIG. 8 is a diagram of a spherical test antenna support matrix on which the multiple test antennas of FIG. 3 can be mounted, where each of the multiple test antennas may be selectively activated in accordance with an embodiment of the present invention.

In another suitable arrangement, a spherical test antenna support structure such as structure 400 may be used within test chamber 206 (see, e.g., FIG. 8). As shown in FIG. 8, structure 400 may include a matrix (or mesh) formed from horizontal support members 402 and vertical support members 404. In general, test antennas 208 may be mounted on any location along a particular member 402 or 404. In the example of FIG. 8, test antennas 208 are positioned such that test antennas 208 are equally distributed throughout structure 400. A sufficient number of antennas may be used to achieve at least five degrees angular resolution across all possible orbital planes. Radio-frequency test signals may be provided from satellite navigation system emulator 204 to each test antenna 208 via a respective path 406 in downlink direction 408.

Spherical structure 400 may be fixed. The geometric emulation of satellite orbital planes may be achieved by selectively activating desired subsets of antennas 208 mounted on matrix 400. For example, a first subset of antennas 208 may be activated to emulate satellites associated with a first orbital plane in the GPS constellation, a second subset of antennas 208 may be activated to emulate satellites associated with a second orbital plane in the GPS constellation, etc. Emulator 204 may be capable of outputting test signals to the appropriate test antennas 208.

Figure 9:
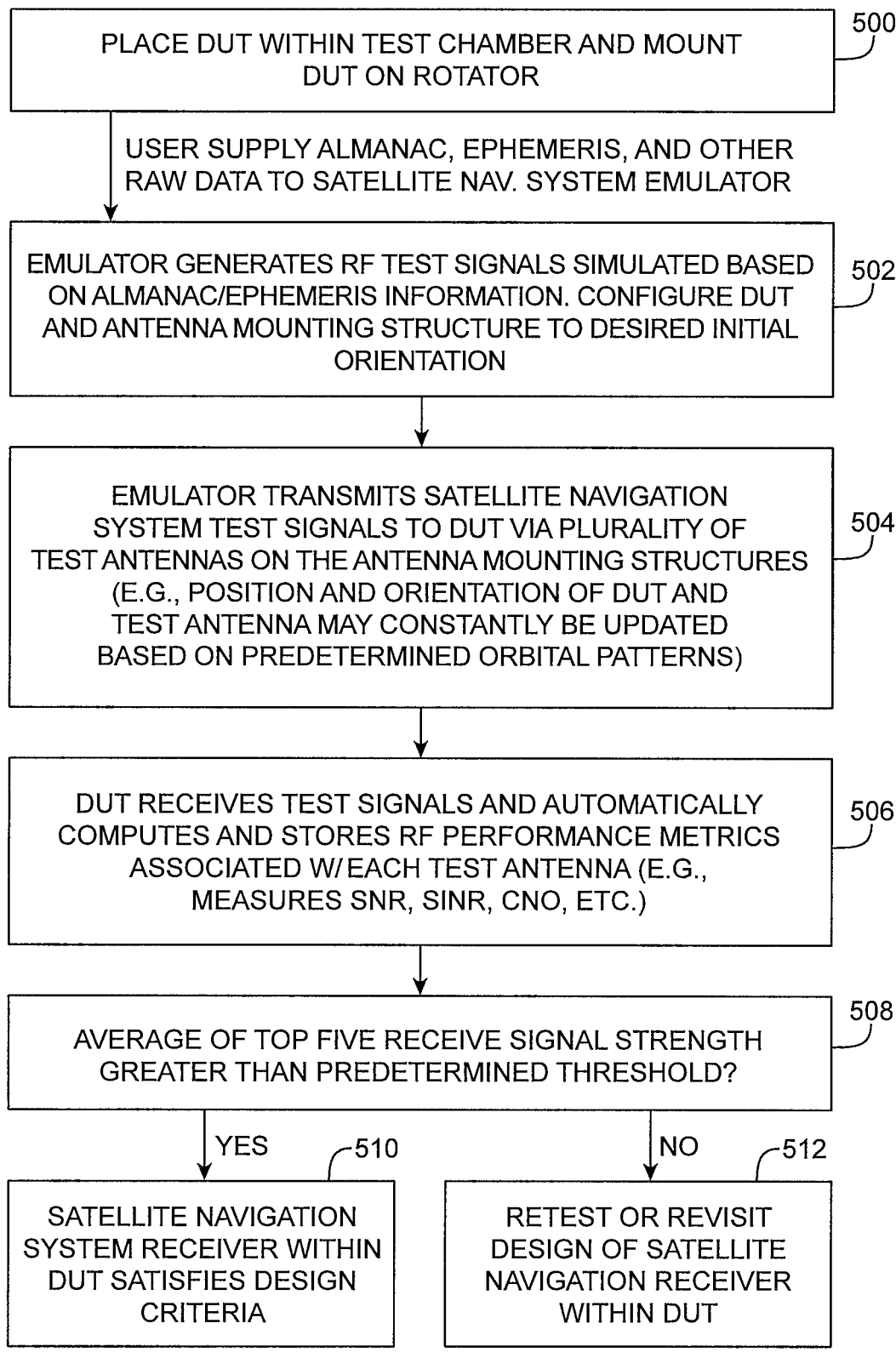
FIG. 9 is a flow chart of illustrative steps involved in operating the test system of FIG. 3 in accordance with an embodiment of the present invention.

FIG. 9 is a flow chart of illustrative steps involved in operating test system 200 described in connection with FIGS. 3-8. At step 500, DUT 10 may be placed within test chamber 206 and DUT may be mounted on DUT rotator 212. Test host 202 may then provide user-supplied almanac and ephemeris information to satellite system navigation emulator 204.

At step 502, emulator 204 may be used to generate radio-frequency test signals simulated based on the user-supplied almanac and ephemeris information. DUT rotator 212 may also be used to place DUT 10 in a desired starting orientation while antenna mounting structure(s) 300 may be placed in a desired configuration depending on the current satellite constellation under test. For example, antenna mounting structures 300 used to emulate the orbital planes of the GPS constellation may be configured differently than structures 300 used to emulate the orbital planes of the GLONASS constellation.

At step 504, emulator 204 may radiate the test signals to DUT 10 via test antennas 208. While the simulated satellite test signals are being transmitted from test antennas 208 to receiver 35 of DUT 10, the position of DUT 10 and the orientation/position of antenna mounting structures 300 may constantly be updated based on predetermined orbital patterns (e.g., based on known or predicated orbiting behavior of satellites 12 over time).

At step 506, DUT 10 may receive the transmitted test signals using receiver 35 and may be configured to automatically compute and store desired signal quality measurements for signals received from each transmitting antenna 208. Examples of signal quality measurements that may be made in device 10 include bit error rate measurements, signal-tonoise ratio measurements, measurements on the amount of power associated with incoming wireless signals, channel quality measurements based on received signal strength indicator (RSSI) information (RSSI measurements), channel quality measurements based on received signal code power (RSCP) information (RSCP measurements), channel quality measurements based on signal-to-interference ratio (SINR) and signal-to-noise ratio (SNR) information (SINR and SNR measurements), carrier-to-noise (CNO) ratio, etc.

At step 508, an average of the top five receive signal strengths may be computed (as an example). This average value may be compared to a predetermined threshold. If the average value is greater than the predetermined threshold, satellite navigation system receiver 35 within DUT 10 may be considered to operate satisfactorily according to design criteria. If, however, the average value is less than the predetermined threshold, DUT 10 may be retested or the design of receiver 35 may be revisited to determine the cause of failure.

The foregoing is merely illustrative of the principles of this invention and various modifications can be made by those skilled in the art without departing from the scope and spirit of the invention. The foregoing embodiments may be implemented individually or in any combination.

What is claimed is:

1. A radio-frequency test system for testing an electronic device, comprising:
    a first plurality of test antennas configured to emulate satellites associated with a first orbital plane in a given satellite constellation;
    a second plurality of test antennas configured to emulate satellites associated with a second orbital plane in the given satellite constellation; and
    a satellite navigation system simulator configured to receive ephemeris and almanac data and to generate radio-frequency test signals to be transmitted to the electronic device using the first plurality of test antennas and the second plurality of test antennas based on the ephemeris and almanac data.

2. The radio-frequency test system defined in claim 1 further comprising:
    an anechoic test chamber in which the first plurality of test antennas and the second plurality of test antennas are mounted, wherein the electronic device is placed within the anechoic test chamber during testing.

3. The radio-frequency test system defined in claim 1 further comprising:
    a first antenna mounting structure on which the first plurality of test antennas is mounted; and
    a second antenna mounting structure on which the second plurality of test antennas is mounted.

4. The radio-frequency test system defined in claim 3, wherein the first and second antenna mounting structures comprises ring-shaped antenna mounting structures.

5. The radio-frequency test system defined in claim 4 further comprising:
    positioning equipment configured to rotate the first and second ring-shaped antenna mounting structures during testing.

6. The radio-frequency test system defined in claim 1 further comprising:
    a positioner for moving the electronic device relative to the first plurality of test antennas and the second plurality of test antennas during testing.

7. The radio-frequency test system defined in claim 1 further comprising:
    a test host configured to supply the ephemeris and almanac data to the satellite navigation system simulator.

8. A method for using a test system to test a device under test having a satellite navigation system receiver, wherein the test system includes a radio-frequency tester and a plurality of test antennas, the method comprising:
    with the radio-frequency tester, generating radio-frequency test signals;
    with the plurality of test antennas, radiating the radio-frequency test signals generated using the radio-frequency tester, wherein each test antenna in the plurality of test antennas is configured to emulate a respective satellite in a given satellite constellation; and
    while the radio-frequency test signals are transmitted from the plurality of test antennas to the device under test, moving the device under test.

9. The method defined in claim 8, wherein the test system further includes an anechoic test chamber in which the plurality of test antennas are mounted, the method further comprising:
    placing the device under test within the anechoic test chamber.

10. The method defined in claim 8, wherein the radio-frequency tester comprises a satellite navigation system simulator, the method further comprising:
    with the satellite navigation system simulator, receiving ephemeris and almanac data, wherein generating the radio-frequency test signals comprises generating the radio-frequency test signals with the satellite navigation system simulator based on the received ephemeris and almanac data.

11. The method defined in claim 8, wherein the test system further includes at least one ring-shaped antenna mounting structure to which the plurality of test antennas is mounted, the method further comprising:
    with positioning equipment, rotating the at least one ring-shaped antenna mounting structure during testing, wherein the plurality of test antennas mounted on the at least one ring-shaped antenna mounting structure is configured to emulate satellites associated with an orbital plane in a satellite constellation selected from the group consisting of: a Global Positioning System (GPS) constellation and a Global Navigation Satellite System (GLONASS) constellation.

12. The method defined in claim 8, wherein the test system further includes a test host, the method further comprising:
    with the test host, retrieving signal strength measurements from the device under test, wherein the signal strength measurements are computed by the device under test based on the radio-frequency test signals received using the satellite navigation system receiver.

13. The method defined in claim 12 further comprising:
    with the test host, computing an average signal strength value based on at least a portion of the signal strength measurements.

14. The method defined in claim 13 further comprising:
    determining whether the satellite navigation system receiver satisfies design criteria by comparing the average signal strength value to a predetermined threshold value.

* * * * *